June 28, 1960   P. C. SHERBURNE   2,942,820
PIPE RISER SUPPORT AND CLAMP
Filed May 28, 1956   3 Sheets-Sheet 1

INVENTOR.
PHILIP C. SHERBURNE
BY
David D. McKenney
ATTORNEY

June 28, 1960 P. C. SHERBURNE 2,942,820
PIPE RISER SUPPORT AND CLAMP
Filed May 28, 1956 3 Sheets-Sheet 2

INVENTOR.
PHILIP C. SHERBURNE
BY
David D. McKenney
ATTORNEY

INVENTOR.
PHILIP C. SHERBURNE

United States Patent Office 2,942,820
Patented June 28, 1960

2,942,820

PIPE RISER SUPPORT AND CLAMP

Philip C. Sherburne, Rumford, R.I., assignor to Grinnell Corporation, Providence, R.I., a corporation of Delaware Filed May 28, 1956, Ser. No. 587,800

6 Claims. (Cl. 248—62)

This invention relates to improvements in clamps and more particularly has to do with clamps for engaging a vertically extending portion in a piping system to facilitate the support of the weight of such portion.

Clamps in accordance with this invention are particularly useful in, but are not limited to, power plant piping systems and the like where it is customary to have relatively long vertical runs (risers) of large diameter, heavy-walled pipe. For example, risers of sixteen inch, schedule 160 pipe (American Standards Association designation) extending vertically as much as one hundred feet are not uncommon. The weight of such a riser is considerable, being of the order of 30,000 pounds (insulation included) in the above example, and it is necessary to connect the supporting structure to such risers at selected intervals along their length to avoid dangerous and excessive stresses in the pipe material due to such weight. Because thermal expansion of such a riser causes portions of it to move with changes in temperature, the supporting structure referred to usually comprises constant support hangers.

Where such a riser is the main steam line in a power plant and connects the boiler to the turbine it is common practice to provide at the bottom of such riser a single connection assembly capable of supporting the entire riser weight in the event other supporting connections disposed at the selected intervals should fail.

Frequently in the past such connections have been provided by welding a number of small lugs to the outside surface of the pipe itself at the selected support location, these lugs being disposed in circumferential spaced relationship so as to be engaged by the upper surface of a pipe encircling member.

In one prior form this pipe encircling member has comprised a single pair of pipe straps having their center portions curved to fit the pipe and their extending end portions, joined together by bolts or the like, serving to engage the building frames or auxiliary supporting equipment associated therewith. One disadvantage of this prior arrangement is that in order to successfully resist the large bending forces imposed on these end portions without unsafe stresses therein, the straps must be relatively wide and thick. For example, where the weight of a riser portion to be supported is 30,000 pounds and the end portions are engaged by supports twelve inches from the exterior pipe surface, the width and thickness of a proper strap of a steel conventionally used for this purpose would be of the order of eight inches and one and one-half inches, respectively. The weight of such a clamp would be of the order of 450 pounds. This steel is one alloyed so as to have the ability to withstand temperatures in the neighborhood of 1100° F., for example, A-213-T22 (ASTM Specification).

In an effort to overcome this disadvantage of having to use relatively thick pipe straps (which are difficult and expensive to cut and form) of relatively great width (which results in a heavy device), another arrangement has been employed in the past in which the pipe encircling member comprises a continuous flat ring having one surface adapted to engage the lugs and having additional members associated with this ring to provide strength and rigidity in the assembly and convenient connection to building frames or other fixed structure.

One serious disadvantage of assemblies of this latter type is that the riser piping which they are to support must be passed through them before the piping sections are finally welded or otherwise secured together. Accordingly, extra care must be taken in the design of the system to insure that the proper number of such assemblies will be used and that they will be capable of providing the required support, because once the piping system is completed additional assemblies of this type cannot be installed without cutting the pipe or cutting the assembly into two halves and welding it back together again around the pipe.

Cutting the pipe once the system has been completed is undesirable for obvious reasons. Cutting an assembly of the type described and welding it togther around the pipe is undesirable because of the difficulty in supporting the two halves in position around the pipe for welding, a particularly unfortunate procedure when such welding may have to be done at an intended location of the assembly at a point on the riser high above the ground.

Furthermore, even if the proper number of assemblies of this type are specified and passed onto the pipe before the latter is completed, they must be lifted into place and temporarily supported until the lugs are welded on and additional structure is furnished in the proper locations on the building frames to engage these assemblies and enable them to support the pipe. It is not always convenient or possible to have such lugs and additional structure provided before the piping is completed, and in view of the fact that these prior pipe encircling assemlies are often exceedingly heavy (the weight of an assembly of this type which would support 30,000 pounds would be of the order of 350 pounds) lifting them into position and temporarily supporting them there is a serious problem.

Still another disadvantage of the prior assemblies of the type referred to is their high cost of manufacture arising from the fact that the flat pipe encircling rings are of such a shape that considerable steel is wasted when they are made. The most inexpensive way to form such rings is to cut them from available standard rectangular steel plate. This results in considerable waste metal where the hole in the ring is cut and between the outer edge of the circular ring and the edges of the rectangular stock. When steel plate one and one quarter inches thick is used (and this is common) cutting out a customary ring of sixteen inches inside diameter and twenty-four inches outside diameter wastes 185 pounds of steel which today costs eighteen cents per pound. Since two rings are used the price to the customer for such an assembly may include at least $66.00 for waste steel if this waste cannot be used for other purposes.

The present invention solves these and other problems by providing a new and improved assembly in the general form of a pipe strap clamp having members which are rigidly secured to the support engaging strap ends, which are adapted to extend along the pipe from these strap ends and which are further adapted to be fixed with respect to the pipe at points remote from the strap ends. By this arrangement excessive bending stress in the strap ends is prevented even where the strap is of relatively light construction, and the arrangement is such that the improved clamp assembly may be located on the piping after the latter has been completely made up. In addition the arrangement enables the parts of the assembly to be formed from regular stock shapes without appreciable waste. Also in the parts which must resist bending force the most efficient use is made of the material in such parts.

Accordingly, it is an object of the present invention to provide an improved clamp for piping and the like comprising a pipe strap assembly having the extending ends of the straps adapted to engage supporting structure and having members rigidly secured to said strap ends and adapted to be fixed with respect to said piping at points remote from said strap ends.

Another object of the invention is to provide an improved clamp of the kind described in the previous object which is adapted to be installed in working position around the piping after the latter has been completely made up.

Another object is to provide an improved pipe clamp of the kind described in the previous objects which may be formed from conventional stock shapes without significant waste.

Another object is to provide an improved pipe clamp of the kind described in the previous objects in which the members rigidly secured to the strap ends extend therefrom along the pipe to the remote points, in which bending of the strap ends during support tends to swing such members away from the pipe at such points, and in which another pipe strap assembly at such points restrains such swinging.

Another object is to provide an improved pipe clamp of the kind described in any of the previous objects in which the major cross-sectional dimensions of the straps in the first strap assembly are oriented to afford maximum bending resistance.

Another object is to provide a pipe clamp of the above nature which will be simple in construction, inexpensive to manufacture, easy to install and manipulate, compact, and very efficient and durable in use.

Other objects will appear hereinafter.

The best mode in which it has been contemplated applying the principles of the present invention are shown in the accompanying drawings but the latter are to be deemed merely illustrative because it is intended that the patent shall cover by suitable expression in the appended claims whatever features of patentable novelty exist in the invention disclosed.

Figure 1:
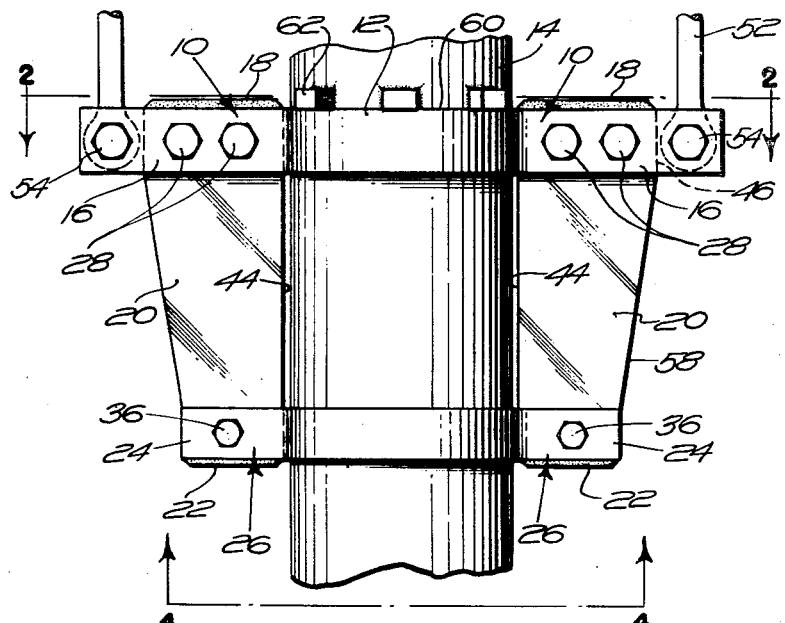
Figure 1 is a front elevation view of the preferred form of the clamp assembly of the present invention.
Figure 2:
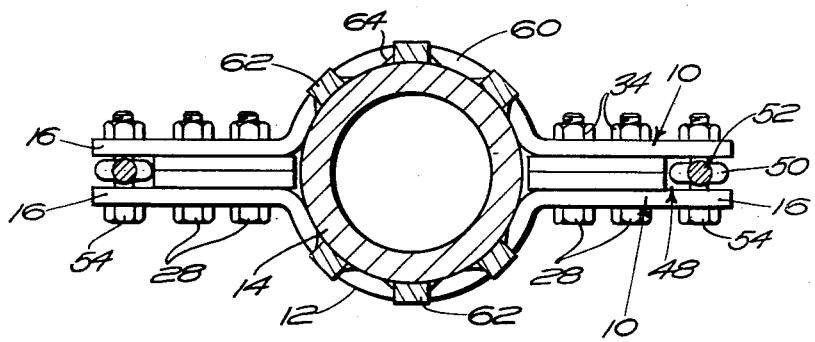
Figure 2 is a cross section plan view taken on line 2—2 of Fig. 1.
Figure 3:
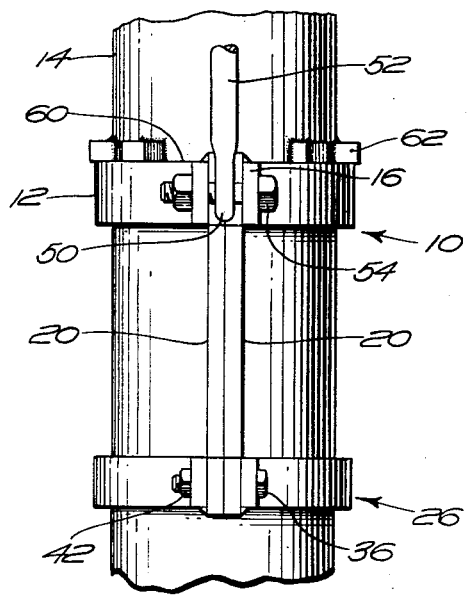
Figure 3 is a side elevation view of the assembly of Fig. 1.
Figure 4:
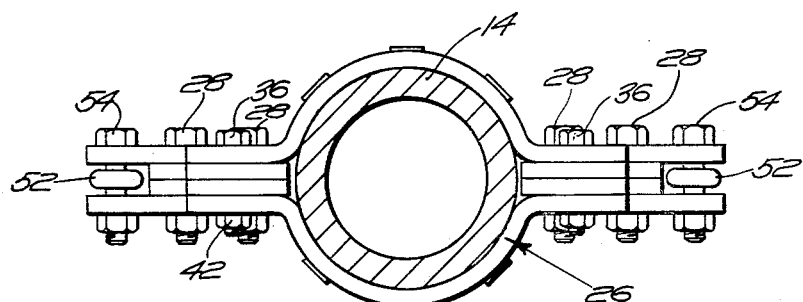
Figure 4 is another cross section plan view taken on line 4—4 of Fig. 1.

Referring now more particularly to the drawings, Figs. 1 to 5 show a preferred embodiment of the present invention in which a pair of pipe straps 10 are employed each having a center portion 12 curved to match the exterior surface of the pipe 14 with which the clamp is intended to be used and to extend somewhat less than halfway therearound. Each strap also has flat end portions 16 adapted to extend generally outward from the pipe surface, spaced apart from but parallel to the corresponding flat end portions 16 of the other strap 10. On opposite sides of the pipe between the spaced corresponding strap ends 16 are located the ends 18 of a pair of adjacent plate members 20 extending along the pipe and having their other ends 22 similarly located between the spaced ends 24 of another pair of pipe straps 26 similar to the first pair but preferably lighter in construction and spaced substantially therefrom.

Two bolts 28 are passed through suitable holes 30 (see Fig. 5) in each extending strap end portion 16 and through corresponding holes 32 in the plate member end 18 therebetween, and nuts 34 threaded onto these bolts serve to rigidly fasten together the corresponding strap ends 16 and plate members 20. Similarly one bolt 36 is passed through a suitable hole 38 (see Fig. 5) in each extending strap end portion 24 of the pipe strap 26 and through a corresponding hole 40 in the other plate member end 22 therebetween, and nut 42 threaded onto this bolt 36 serves to fasten together the corresponding strap ends 24 and plate member.

The inside edge 44 of each plate member is preferably spaced slightly from the outside surface of the pipe 14 when the assembly is installed. The outside edge of each plate member is preferably spaced inwardly at 46 from the ends of the extending clamp portions 16 where this plate member lies between such portions, thus providing a space 48 between these portions to accommodate the end 50 of a suspension rod 52 or other supporting structure adapted to engage the assembly, as for example by encircling a bolt 54 passing through aligned holes 56 in the strap ends 16.

Between the straps 10 and 26 the outside edges 58 of the plate members 20 may have any suitable shape, provided these members are capable of performing their intended function as hereinafter described. For example, these edges may extend somewhat inwardly with respect to the pipe from the straps 10 to the straps 26, as shown in Fig. 1.

The upper edges 60 of the pipe strap center portions 12 serve to engage the undersides of lugs 62 secured to the pipe 14 in spaced circumferential relation by welds 64.

Figure 5:
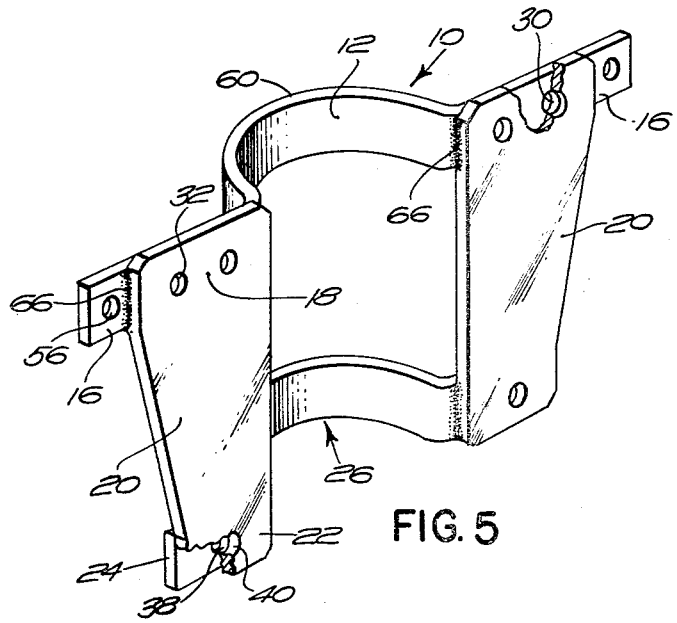
Figure 5 is a perspective view of a portion of the clamp assembly of Fig. 1.

Figure 5 illustrates that the complete assembly may be formed in two parts, each constituting a pipe strap segment 10, a corresponding pipe strap segment 26 and two of the plate members 20 welded to the extending strap segment ends so that the various holes 30 and 32 and 38 and 40 register. Such welds are shown, for example, at 66. By this arrangement the assembly is more easily handled and assembled around the pipe at the desired location.

The operation of the device of Figs. 1 to 5 is as follows: The portion of the riser weight which is to be supported by the assembly is exerted downwardly on the curved clamp portions 12 through the lugs 62. This weight is resisted by the two suspension rods 52, thereby providing, in effect, a static system comprising two beams each fixed to the pipe and extending outward therefrom and each having an upward force exerted at the end thereof equal to one half the weight to be supported. The extending clamp portions 16 do not have to be strong enough themselves to resist excessive bending distortion and keep the stresses in the material within safe limits because of the provision of the plate members 20 and the pipe straps 26. Thus, since the plate member ends 18 are rigidly secured to the extending clamp portions 16 by bolts 28 and nuts 34 (and also by welds 66) and since the plate members extend downwardly from these portions along the pipe, the upward force exerted by suspension rod 52 tends to bend the extending clamp portions 16 upwardly. Consequently, the lower ends 22 of the plate members are urged substantially radially outwardly from the pipe. The resistance to outward movement of the plate member ends 22 which is afforded by the pipe straps 26 in turn provides resistance to upward bending of the extending strap portions 16 through the rigid connection of the plate members to these portions. Accordingly, the straps 10 may be made considerably lighter than they would have to be to alone resist the bending force, and although the plate members 20 and straps 26 are necessary the total weight of the improved depice is found to be substantially less than the weight of a device of the prior type comprising merely a conventional pipe strap assembly.

Although the above described embodiment employs two bolts 28 to rigidly connect the plate members to the extending strap portions as well as to assemble the clamp around the riser, it will be understood that this rigid connection may be achieved in others ways, as, for example, by means of the welds 66 made to be of such strength as to safely withstand the forces involved. In such case a single bolt 28 may be used.

I claim:

1. For supporting a riser pipe a clamp assembly comprising a plurality of adjacent elongated pipe straps each having a center portion lying substantially in a first flat plane and following the curve of a circle included in said plane and each having end portions extending from said center portion in said plane outwardly with respect to said circle, means for securing the extending end portions of each strap to the corresponding end portions of the adjacent straps, means on the secured extending strap end portions at points spaced substantially from said circle for connecting said end portions to fixed structure, a rigid plate member rigidly secured to each extending pipe strap portion between the last mentioned means and said center portion and extending from said pipe strap portion substantially at a right angle to said plane to a second flat plane parallel to said first plane and remote therefrom, and a plurality of straps fastened to said rigid members at said second plane and engaging a surface lying substantially in a cylindrical plane at right angles to said second flat plane and including said circle, said last mentioned straps connecting together all of said rigid members.

2. For supporting a riser pipe a clamp assembly comprising a first pair of elongated pipe straps each having a center portion which lies substantially in a first flat plane, which follows the curve of a cylindrical plane at right angles to said first plane and which extends substantially half way around said cylindrical plane, said straps also each having end portions extending from said center portion in said plane and outwardly from said cylindrical plane in opposite directions, a pair of rigid plates each having one end interposed between the extending strap end portions, means for rigidly securing said plate ends to said extending strap end portions, means on said extending strap end portions outwardly of said plate ends for securing the assembly to fixed structure, said plates each having its other end in a second flat plane parallel to said first plane and remote therefrom, a second pair of pipe straps in said second plane each having a center portion which follows the curve of said cylindrical plane and which extends substantially half way therearound, said second pair of straps also each having end portions extending from said center portion in said second plane and outwardly from said cylindrical plane in the said opposite directions, said other plate ends being interposed between the extending strap end portions of said second pair of straps and being secured thereto.

3. In combination with a riser pipe and fixed structure from which said riser pipe is to be supported, a clamp assembly comprising a plurality of sections, at least one of said sections having a pipe strap with a first portion curved to fit circumferentially at least part way around said pipe and with a second portion extending from said first portion outwardly with respect to said pipe, means on said second portion at a point spaced from said pipe connecting said assembly to said fixed structure, a member rigidly secured to said second pipe strap portion intermediate the said first portion and said means and extending downwardly therefrom along said pipe to a point remote from said strap, a second strap on said member at said remote point engaging said pipe and preventing movement of said member at said point with respect to said pipe, and means secured to said pipe above said first pipe strap for engaging said curved first portion.

4. A clamp assembly for supporting a pipe riser comprising a plurality of separable sections, at least one of said sections having a strap with two straight end portions and an intermediate curved portion adapted to engage a portion of the outer circumference of a pipe, said two straight end portions extending from said intermediate curved portion at the ends thereof in the same plane as the said curved portion, means at the outer ends of said end portions for connecting said strap to fixed structure, a flat plate rigidly fastened at one end to each of said end portions intermediate said outer ends and said curved portion, said flat plate being oriented perpendicularly to the plane of said curved portion, a second strap having two straight end portions and an intermediate curved portion adapted to encircle a portion of the outer circumference of the same pipe as the said first strap, said two straight end portions extending from said intermediate curved portion of said second strap in the same plane as the said curved portion, said second strap being spaced from and parallel to said first strap, each of said end portions of said second strap being fastened to the same plate as the corresponding end portion of said first strap.

5. A clamp assembly for supporting a pipe riser comprising a plurality of separable sections, at least one of said sections having a strap with two straight end portions and an intermediate curved portion adapted to engage a portion of the outer circumference of a pipe, said two straight end portions extending from said intermediate curved portion at the ends thereof in the same plane as the said curved portion, means at the outer ends of said end portions for connecting said strap to fixed structure, a flat plate rigidly fastened at one end to each of said end portions intermediate said outer ends and said curved portion, said flat plate being oriented perpendicularly to the plane of said curved portion, a second strap having two straight end portions and an intermediate curved portion adapted to encircle a portion of the outer circumference of the same pipe as the said first strap, said two straight end portions extending from said intermediate curved portion of said second strap in the same plane as the said curved portion, said second strap being spaced from and parallel to said first strap, each of said end portions of said second strap being rigidly fastened to the same plate as the corresponding end portion of said first strap.

6. A clamp assembly for supporting a pipe riser comprising a pair of separable sections each containing a strap having two straight end portions and an intermediate curved portion adapted to engage a portion of the outer circumference of a pipe, said two straight end portions extending from said intermediate curved portion at the ends thereof in the same plane as the said curved portion, means at the outer ends of said end portions for connecting said strap to fixed structure, a flat plate rigidly fastened at one end to each of said end portions intermediate said outer ends and said curved portion, said flat plate being oriented perpendicularly to the plane of said curved portion, a second strap having two straight end portions and an intermediate curved portion adapted to encircle a portion of the outer circumference of the same pipe as the said first strap, said two straight end portions extending from said intermediate curved portion of said second strap in the same plane as the said curved portion, said second strap being spaced from and parallel to said first strap, each of said end portions of said second strap being rigidly fastened to the same plate as the corresponding end portion of said first strap, means for fastening said sections together in complementary relation about said outer circumference.

References Cited in the file of this patent

UNITED STATES PATENTS

| | | |
|---|---|---|
| 1,824,459 | Beckwith | Sept. 22, 1931 |
| 2,447,830 | Wood | Aug. 24, 1948 |
| 2,670,170 | Haarmann | Feb. 23, 1954 |
| 2,708,686 | Bernard et al. | May 17, 1955 |